(12) United States Patent
Lee et al.

(10) Patent No.: US 12,354,807 B2
(45) Date of Patent: Jul. 8, 2025

(54) MULTILAYER ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Kangha Lee, Suwon-si (KR); Yoona Park, Suwon-si (KR); Jinsoo Park, Suwon-si (KR); Wookyung Sung, Suwon-si (KR); Eunme Park, Suwon-si (KR); Jung Min Kim, Suwon-si (KR); Ji Hye Han, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 133 days.

(21) Appl. No.: 18/093,207

(22) Filed: Jan. 4, 2023

(65) Prior Publication Data

US 2023/0282420 A1 Sep. 7, 2023

(30) Foreign Application Priority Data

Mar. 3, 2022 (KR) .................. 10-2022-0027532

(51) Int. Cl.
*H01G 4/30* (2006.01)
*H01G 4/12* (2006.01)
*H01G 4/232* (2006.01)

(52) U.S. Cl.
CPC .............. *H01G 4/30* (2013.01); *H01G 4/12* (2013.01); *H01G 4/2325* (2013.01)

(58) Field of Classification Search
None
See application file for complete search history.

(56) References Cited

U.S. PATENT DOCUMENTS 6,388,864 B1 * 5/2002 Nakagawa ............... H01G 2/14
361/312
2016/0254094 A1 * 9/2016 Lee ...................... H01G 4/2325
361/301.4

(Continued)

FOREIGN PATENT DOCUMENTS

JP 2015035631 A * 2/2015 ............. H01G 4/012
JP 2017-11145 A 1/2017

(Continued)

*Primary Examiner* — Eric W Thomas
(74) *Attorney, Agent, or Firm* — Morgan Lewis & Bockius LLP

(57) ABSTRACT

A multilayer electronic component includes a body including first and second surfaces opposing each other in the first direction, and third and fourth surfaces connected to the first and second surfaces and opposing each other in a second direction, a first external electrode including a first base electrode layer including glass and Ni and disposed on the third surface, a first intermediate electrode layer including an alloy containing Sn and Ni and disposed on the first base electrode layer, and a first conductive resin layer including a resin and a metal and disposed on the first intermediate electrode layer and extending to the first and second surfaces, a second external electrode including a second base electrode layer disposed on the fourth surface, a second intermediate electrode layer disposed on the second base electrode layer, and a second conductive resin layer disposed on the second intermediate electrode layer.

20 Claims, 8 Drawing Sheets

(56) References Cited

U.S. PATENT DOCUMENTS

| | | |
|---|---|---|
| 2016/0379758 A1 | 12/2016 | Otani |
| 2018/0166215 A1 | 6/2018 | Hamanaka et al. |
| 2019/0180941 A1* | 6/2019 | Choi ........................ H01G 4/30 |
| 2019/0392991 A1 | 12/2019 | Harada |
| 2021/0343476 A1* | 11/2021 | Nomura ............... H01G 4/1218 |

FOREIGN PATENT DOCUMENTS

| | | |
|---|---|---|
| JP | 2018-98475 A | 6/2018 |
| JP | 2019-220602 A | 12/2019 |

* cited by examiner

MULTILAYER ELECTRONIC COMPONENT AND METHOD OF MANUFACTURING THE SAME

CROSS-REFERENCE TO RELATED APPLICATION(S)

This application claims benefit of priority to Korean Patent Application No. 10-2022-0027532 filed on Mar. 3, 2022 in the Korean Intellectual Property Office, the disclosure of which is incorporated herein by reference in its entirety.

TECHNICAL FIELD

The present disclosure relates to a multilayer electronic component and a method of manufacturing the same.

BACKGROUND

A multilayer ceramic capacitor (MLCC), a multilayer chip electronic component, is a chip-type condenser mounted on the printed circuit boards of various electronic products such as display devices including liquid crystal displays (LCDs) and plasma display panels (PDPs), computers, smartphones, cell phones, and the like, to allow electricity to be charged therein and discharged therefrom.

Such an MLCC, having advantages of compactness, guaranteed high capacitance, and ease of mounting, may be used as a component of various electronic devices. As various electronic devices such as computers and mobile devices have been miniaturized and have been implemented with high power, demand for miniaturized multilayer ceramic capacitors having high capacitance has increased. In addition, as flexible/foldable devices have been recently developed and popularized, various functions are required for MLCCs used in such devices. To this end, MLCCs are required to have much higher capacitance than before while having the same size, and at the same time, mounting cracks that may occur during a reflow heat treatment process and flex cracks caused by stress applied to a substrate after mounting need to be prevented.

In addition, MLCCs that may not be changed in terms of characteristics even at high temperatures and that may be ensured in terms of reliability need to be developed. Reliability degradation at high temperatures is affected by hydrogen generated during a plating process, and to prevent this, a technology that may be able to prevent hydrogen generated during plating from penetrating into a body as much as possible is required.

SUMMARY

Exemplary embodiments provide a multilayer electronic component having improved high-temperature reliability.

Exemplary embodiments provide a multilayer electronic component in which the occurrence of mounting cracks and flex cracks is suppressed.

Exemplary embodiments improve physical and electrical connectivity between a base electrode layer and a conductive resin layer.

Exemplary embodiments provide a multilayer electronic component in which an occurrence of radiating cracks is suppressed.

According to an aspect of the present disclosure, a multilayer electronic component includes a body including a dielectric layer and first and second internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction, a first external electrode including a first base electrode layer disposed on the third surface, a first intermediate electrode layer disposed on the first base electrode layer, and a first conductive resin layer disposed on the first intermediate electrode layer and extending to the first and second surfaces, and a second external electrode including a second base electrode layer disposed on the fourth surface, a second intermediate electrode layer disposed on the second base electrode layer, and a second conductive resin layer disposed on the second intermediate electrode layer and extending to the first and second surfaces, wherein the first and second base electrode layers include glass and Ni, the first and second intermediate electrode layers include an alloy containing Sn and Ni, and the first and second conductive resin layers include a resin and a metal.

According to another aspect of the present disclosure, a method of manufacturing a multilayer electronic component includes preparing a body including a dielectric layer and internal electrodes, compressing the body on a sheet including glass and Ni to attach the sheet to the body and performing a sintering operation to form a base electrode layer of an external electrode, forming an Sn plating layer on the base electrode layer, dipping the body on which the Sn plating layer is formed into a paste containing a resin and a conductive metal to apply the paste to the Sn plating layer, and performing a curing heat treatment on the paste-applied body to form an intermediate electrode layer and a conductive resin layer of the external electrode, wherein the external electrode includes the base electrode layer, which is disposed on the body, the intermediate electrode layer, which is disposed on the base electrode layer, and the conductive resin layer, which is disposed on the intermediate electrode layer, the base electrode layer includes the glass and Ni, the intermediate electrode layer includes an alloy containing Sn and Ni, and the conductive resin layer includes a resin and a metal.

According to another aspect of the present disclosure, a multilayer electronic component includes a body including a dielectric layer and first and second internal electrodes alternately disposed with the dielectric layer interposed therebetween in a first direction and including first and second surfaces opposing each other in the first direction, and third and fourth surfaces connected to the first and second surfaces and opposing each other in a second direction, a first external electrode including a first base electrode layer disposed on the third surface, a first intermediate electrode layer disposed on the first base electrode layer, and a first conductive resin layer disposed on the first intermediate electrode layer and extending to the first and second surfaces, and a second external electrode including a second base electrode layer disposed on the fourth surface, a second intermediate electrode layer disposed on the second base electrode layer, and a second conductive resin layer disposed on the second intermediate electrode layer and extending to the first and second surfaces, wherein the first and second base electrode layers include glass and Ni, the first and second intermediate electrode layers include a Sn plating layer and an alloy containing Sn and Ni, and the first and second conductive resin layers include a resin and a metal.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
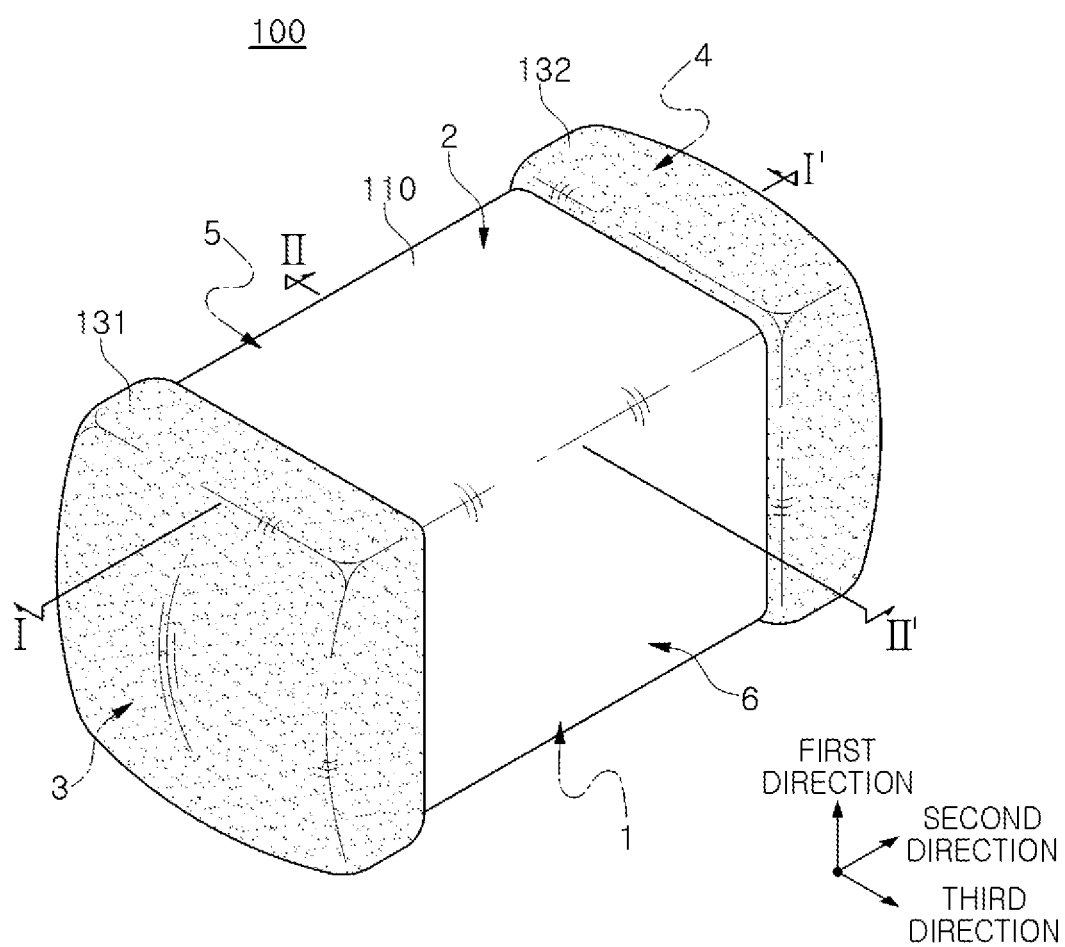
FIG. 1 is a perspective view schematically illustrating a multilayer electronic component according to an exemplary embodiment in the present disclosure.

Hereinafter, exemplary embodiments of the presently disclosed concept will be described in detail with reference to the accompanying drawings. The disclosed concept may, however, be exemplified in many different forms and should not be construed as being limited to the specific exemplary embodiments set forth herein. Rather, these exemplary embodiments are provided so that this disclosure will be thorough and complete, and will fully convey the scope of the disclosed concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements.

In the drawings, a first direction may be defined as a stacking direction or thickness (T) direction, a second direction may be defined as a length (L) direction, and a third direction may be defined as a width (W) direction.

FIG. 1 is a perspective view schematically illustrating a multilayer electronic component according to an exemplary embodiment in the present disclosure.

Figure 2:
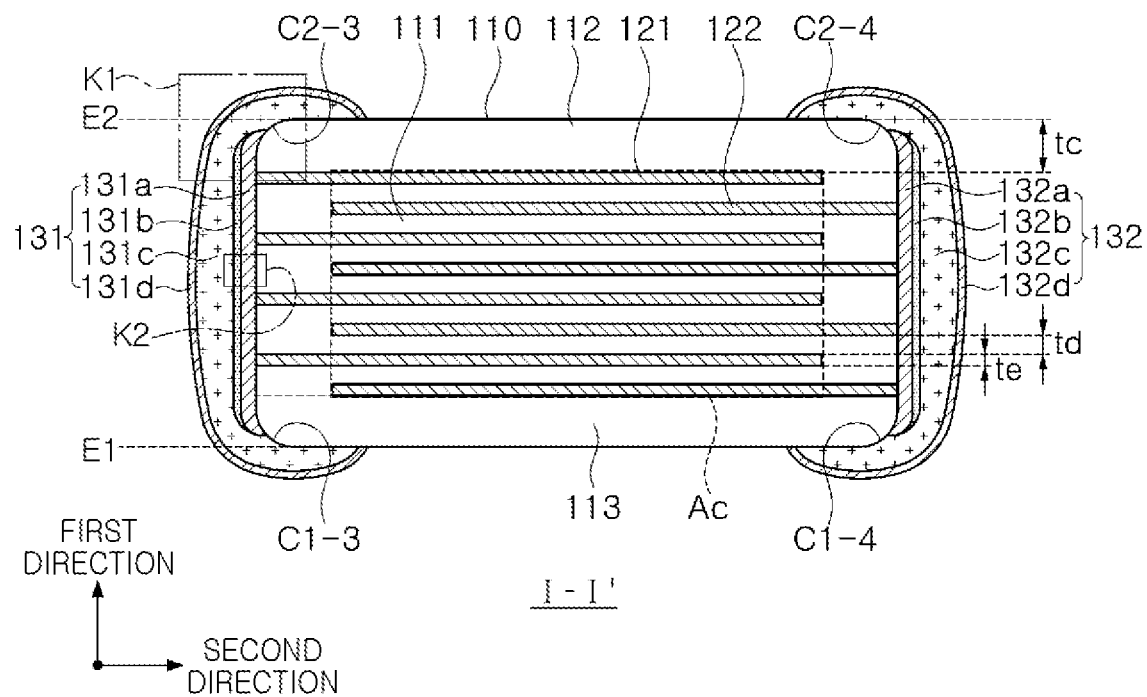
FIG. 2 is a cross-sectional view taken along line I-I' of FIG. 1.

FIG. 2 is a cross-sectional view taken along line I-I' of FIG. 1.

Figure 3:
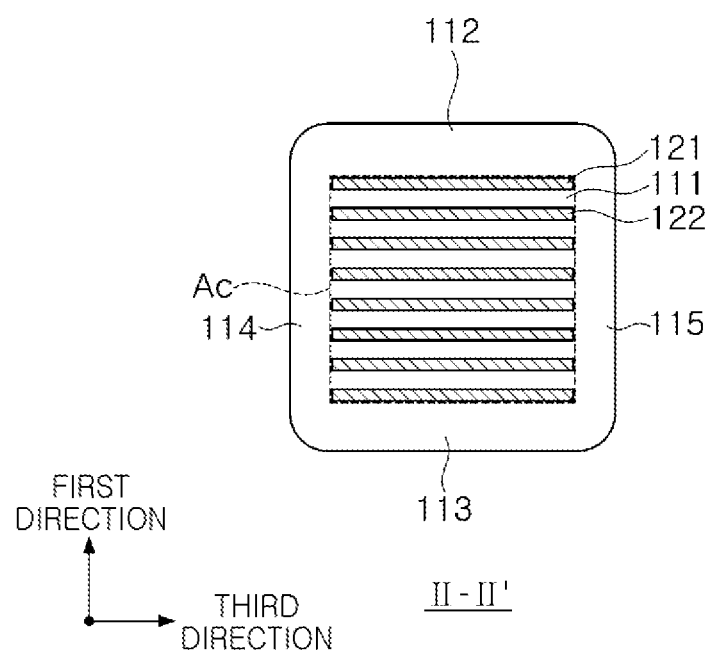
FIG. 3 is a cross-sectional view taken along line II-II' of FIG. 1.

FIG. 3 is a cross-sectional view taken along line II-II' of FIG. 1.

Figure 4:
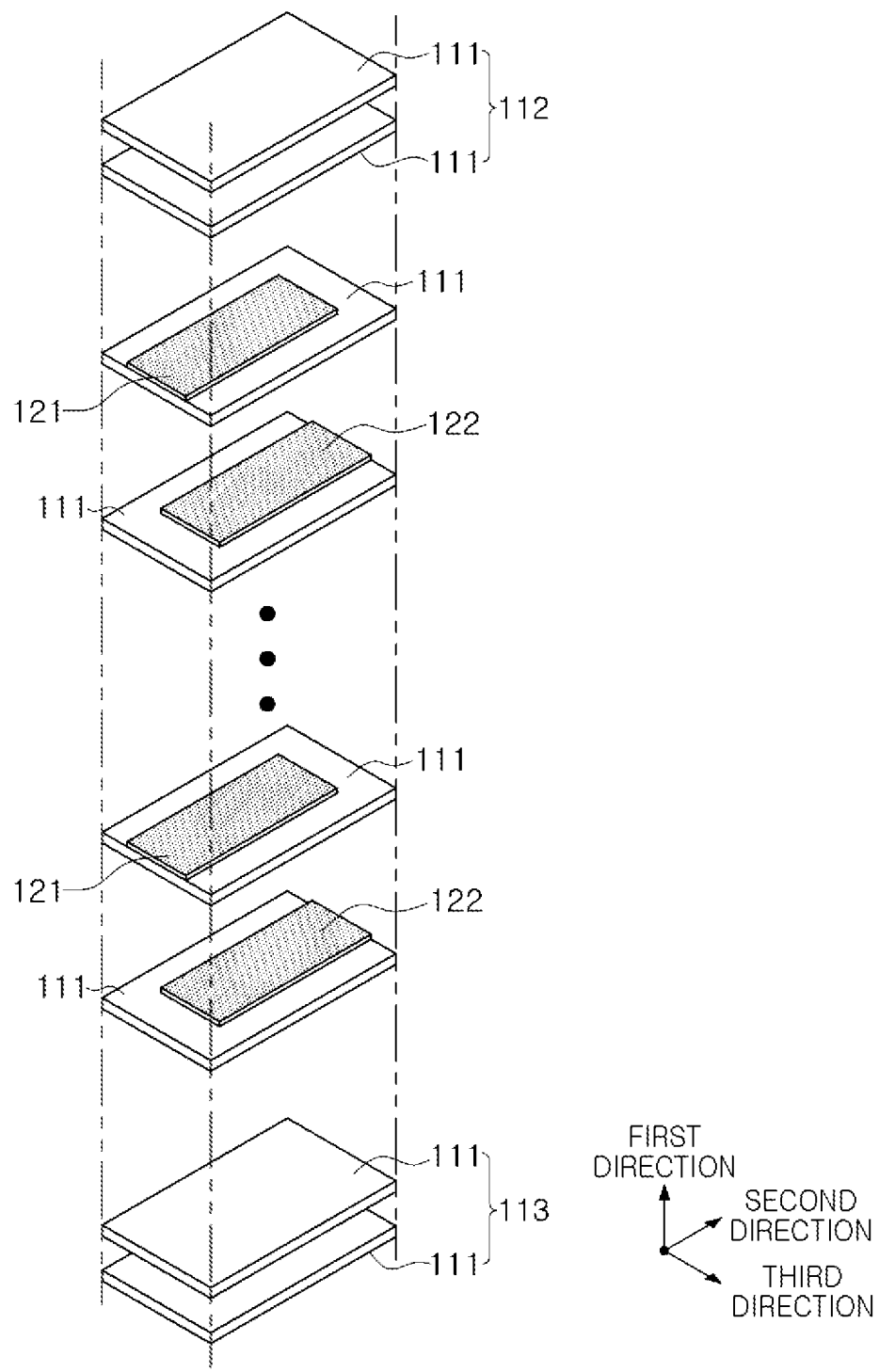
FIG. 4 is an exploded perspective view schematically illustrating a body of a multilayer electronic component according to an exemplary embodiment of the present disclosure.

FIG. 4 is an exploded perspective view schematically illustrating a body of a multilayer electronic component according to an exemplary embodiment of the present disclosure.

Figure 5:
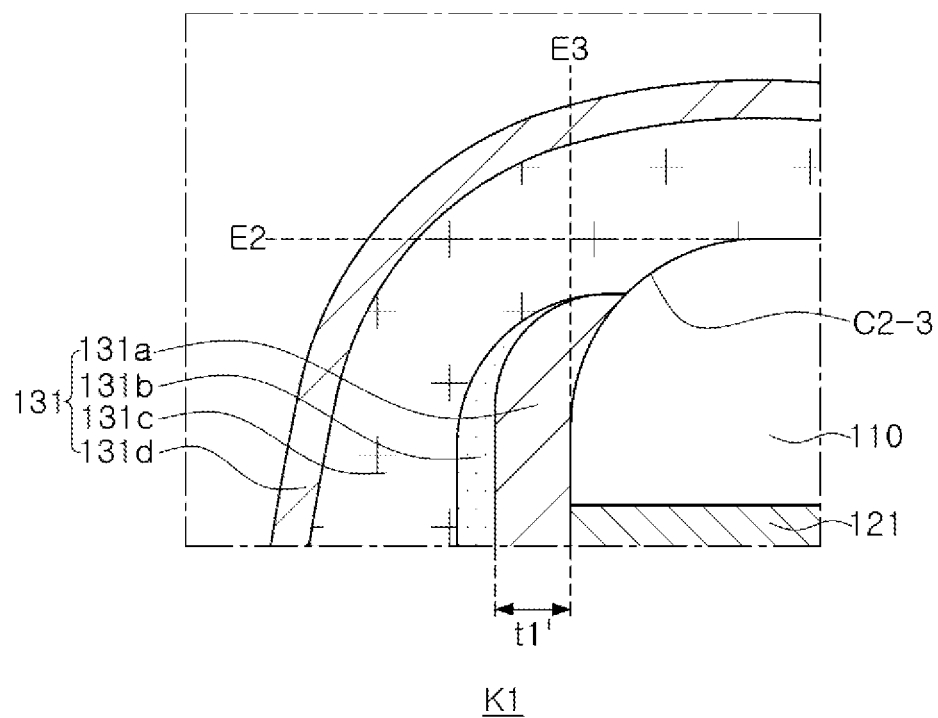
FIG. 5 is an enlarged view of region K1 of FIG. 2.

FIG. 5 is an enlarged view of region K1 of FIG. 2.

Figure 6:
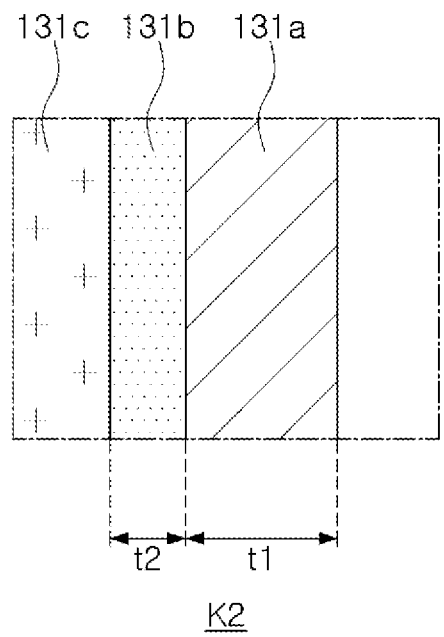
FIG. 6 is an enlarged view of region K2 of FIG. 2.

FIG. 6 is an enlarged view of region K2 of FIG. 2.

Hereinafter, a multilayer electronic component 100 according to an exemplary embodiment of the present disclosure will be described with reference to FIGS. 1 to 6.

The multilayer electronic component 100 according to an exemplary embodiment of the present disclosure includes a body 110 including a dielectric layer 111 and first and second internal electrodes 121 and 122 alternately disposed with the dielectric layer interposed therebetween and including first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction, a first external electrode 131 including a first base electrode layer 131a disposed on the third surface, a first intermediate electrode layer 131b disposed on the first base electrode layer, and a first conductive resin layer 131c disposed on the first intermediate electrode layer and extending to the first and second surfaces, and a second external electrode 132 including a second base electrode layer 132a disposed on the fourth surface, a second intermediate electrode layer 132b disposed on the second base electrode layer, and a second conductive resin layer 132c disposed on the second intermediate electrode layer and extending to the first and second surfaces, wherein the first and second base electrode layers 131a and 132a may include glass and Ni, the first and second intermediate electrode layers 1321b and 132b may include an alloy containing Sn and Ni, and the first and second conductive resin layers 131c and 132c may include a resin and a metal.

In order to suppress an occurrence of mounting cracks and flex cracks, an external electrode having a two-layer structure in which a base electrode layer including metal and glass is disposed on a body and a conductive resin layer including metal and resin is disposed on the base electrode layer may be applied.

However, since the external electrode having the two-layer structure has insufficient bonding strength between the base electrode layer and the conductive resin layer, peeling may occur between the base electrode layer and the conductive resin layer while undergoing a high-temperature process such as a reflow heat treatment and equivalent series resistance (ESR) may increase. In addition, in the external electrode having the two-layer structure, it is difficult to suppress penetration of hydrogen into the body occurring during plating, which may cause a problem in which high temperature reliability is deteriorated.

Accordingly, in the present disclosure, the intermediate electrode layers 131b and 132b including an alloy containing Sn and Ni is disposed between the base electrode layers 131a and 132a and the conductive resin layers 131c and 132c to suppress penetration of hydrogen into the body and improve physical and electrical connectivity between the base electrode layers 131a and 132a and the conductive resin layers 131c and 132c, thereby solving the problem of the external electrode having the two-layer structure.

Hereinafter, each component of the multilayer electronic component 100 according to an exemplary embodiment of the present disclosure will be described in detail.

In the body 110, the dielectric layer 111 and the internal electrodes 121 and 122 are alternately stacked.

Although a specific shape of the body 110 is not particularly limited, as shown, the body 110 may have a hexahedral shape or a shape similar thereto. Due to the shrinkage of ceramic powder particles included in the body 110 during a sintering process, the body 110 may not have a perfectly straight hexahedral shape but may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

In an exemplary embodiment, the body 110 may include a first-third corner c1-3 connecting the first surface and the third surface, a first-fourth corner c1-4 connecting the first surface and the fourth surface, a second-third corner c2-3 connecting the second surface and the third surface, and a second-fourth corner c2-4 connecting the second surface and the fourth surface. The first-third corner and the second-third corner may be contracted to the center of the body in the first direction in a direction toward the third surface, and the first-fourth corner and the second-fourth corner may be contracted to the center of the body in the first direction.

As a margin region in which the internal electrodes 121 and 122 are not disposed overlaps the dielectric layer 111, a step may occur due to a thickness of the internal electrodes 121 and 122, and thus, a corner connecting the first surface to the third to sixth surfaces and/or a corner connecting the second surface to the third to sixth surfaces may be contracted toward the center of the body 110 in the first direction when viewed based on the first surface or the second surface. Alternatively, a corner connecting the first surface 1 to the third to sixth surfaces 3, 4, 5, and 6 and/or a corner connecting the second surface 2 to the third to sixth surfaces 3, 4, 5, and 6 may be contracted toward the center of the body 110 in the first direction when viewed based on the first surface or the second surface. Alternatively, as the corners connecting each surface of the body 110 are rounded by performing a separate process, the corner connecting the first surface to the third to sixth surfaces and/or the corner connecting the second surface to the third to sixth surfaces may have a rounded shape.

The corner may include a first-third corner connecting the first surface and the third surface, a first-fourth corner connecting the first surface and the fourth surface, a second-third corner connecting the second surface and the third surface, and a second-fourth corner connecting the second surface and the fourth surface. In addition, the corner may include a first-fifth corner connecting the first and fifth surfaces, a first-sixth corner connecting the first and sixth surfaces, a second-fifth corner connecting the second and fifth surfaces, and a second-sixth corner connecting the second and sixth surfaces. The first to sixth surfaces of the body 110 may be generally flat surfaces, and non-flat regions may be considered to be corners. Hereinafter, an extension line of each surface may refer to a line extending based on a flat portion of each surface.

Meanwhile, in order to suppress a step difference caused by the internal electrodes 121 and 122, after stacking, the internal electrodes may be cut to be exposed to the fifth and sixth surfaces 5 and 6 of the body and then a single dielectric layer or two or more dielectric layers may be stacked on both side surfaces of a capacitance forming portion Ac to form margin portions 114 and 115, and in this case, the portion connecting the first surface to the fifth and sixth surfaces and the portion connecting the second surface to the fifth and sixth surfaces may not be contracted.

The plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited, as long as sufficient electrostatic capacitance may be obtained therewith. For example, a barium titanate-based material, a lead composite perovskite-based material, or a strontium titanate-based material may be used. The barium titanate-based material may include $BaTiO_3$-based ceramic powder particles, and the ceramic powder particles may include $BaTiO_3$ and $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1, 0<y<1$) or $Ba(Ti_{1-y}Zr_y)O_3$ ($0<y<1$) in which Ca, Zr, and the like are partially dissolved in $BaTiO_3$.

In addition, as a material for forming the dielectric layer 111, various ceramic additives, organic solvents, binders, dispersants, etc. may be added to the powder particles such as barium titanate ($BaTiO_3$) according to purposes of the present disclosure.

Meanwhile, an average thickness td of the dielectric layer 111 may not be particularly limited.

However, in general, when the dielectric layer is formed to be thin to have a thickness less than 0.6 μm, in particular, when the thickness of the dielectric layer is 0.35 μm or less, reliability may be deteriorated.

According to an exemplary embodiment of the present disclosure, since reliability may be improved by disposing an intermediate electrode layer including an alloy containing Sn and Ni between the base electrode layer and the conductive resin layer, excellent reliability may be secured even when the average thickness of the dielectric layer 111 is 0.35 μm or less.

Therefore, when the average thickness of the dielectric layer 111 is 0.35 μm or less, the reliability improvement effect according to the present disclosure may be more remarkable.

The average thickness td of the dielectric layer 111 may refer to an average thickness of the dielectric layer 111 disposed between the first and second internal electrodes 121 and 122.

An average thickness of the dielectric layer 111 may be measured by scanning an image of a cross-section of the body 110 in the length-thickness (L-T) direction with a scanning electron microscope (SEM) having a magnification of 10,000. More specifically, the average value may be measured by measuring the thickness of one dielectric layer at 30 equally spaced points in the longitudinal direction in the scanned image. The 30 points at equal intervals may be designated in the capacitance forming portion Ac. In addition, if the average value is measured by extending the measurement of the average value to 10 dielectric layers, the average thickness of the dielectric layers may be more generalized.

The body 110 may include the capacitance forming portion Ac formed inside the body 110 and forming capacitance with the first internal electrode 121 and the second internal electrode 122 disposed to face each other with the dielectric layer 111 interposed therebetween and cover portions 112 and 113 formed above and below the capacitance forming portion Ac in the first direction.

In addition, the capacitance forming portion Ac is a part that contributes to formation of capacitance of the capacitor, which may be formed by repeatedly stacking a plurality of first and second internal electrodes 121 and 122 with the dielectric layer 111 interposed therebetween.

The cover portions 112 and 113 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate (BaTiO$_3$)-based ceramic material.

Meanwhile, an average thickness of the cover portions 112 and 113 may not be limited. However, an average thickness tc of the cover portions 112 and 113 may be 15 μm or less in order to more easily achieve miniaturization and high capacitance of the multilayer electronic component. In addition, according to an exemplary embodiment of the present disclosure, since reliability may be improved by disposing an intermediate electrode layer including an alloy containing Sn and Ni between the base electrode layer and the conductive resin layer, excellent reliability may be secured even when the average thickness tc of the cover portions 112 and 113 is 15 μm or less.

The average thickness tc of the cover portions 112 and 113 may refer to a size in the first direction, and may be a value obtained by averaging sizes of the cover portions 112 and 113 measured at five equally spaced points above or below the capacitance forming portion Ac.

In addition, margin portions 114 and 115 may be disposed on side surfaces of the capacitance forming portion Ac.

The margin portions 114 and 115 may include a first margin portion 114 disposed on the fifth surface 5 of the body 110 and a second margin portion 115 disposed on the sixth surface 6 of the body 110. That is, the margin portions 114 and 115 may be disposed on both end surfaces of the body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion Ac in the third direction (the width direction).

Meanwhile, the widths of the margins 114 and 115 may not be particularly limited. However, an average width of the margin portions 114 and 115 may be 15 μm or less in order to more easily achieve miniaturization and high capacitance of the multilayer electronic component. In addition, according to an exemplary embodiment of the present disclosure, since reliability may be improved by disposing an intermediate electrode layer including an alloy containing Sn and Ni between the base electrode layer and the conductive resin layer, excellent reliability may be secured even when the average width of the margin portions 114 and 115 is 15 μm or less.

The average width of the margin portions 114 and 115 may refer to an average size of the margin portions 114 and 115 in the third direction, and may be a value obtained by averaging sizes of the margin portions 114 and 115 measured at five equally spaced points on the side surface of the capacitance forming portion Ac.

The internal electrodes 121 and 122 may be alternately stacked with the dielectric layer 111.

The internal electrodes 121 and 122 may include first and second internal electrodes 121 and 122. The first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

Referring to FIG. 3, the first internal electrode 121 may be spaced apart from the fourth surface 4 and may be exposed to the third surface 3, and the second internal electrode 122 may be spaced apart from the third surface 3 and may be exposed to the fourth surface 4. The first external electrode 131 may be disposed on the third surface 3 of the body to be connected to the first internal electrode 121, and the second external electrode 132 may be disposed on the fourth surface 4 of the body to be connected to the second internal electrode 122.

That is, the first internal electrode 121 is not connected to the second external electrode 132 but connected to the first external electrode 131, and the second internal electrode 122 is not connected to the first external electrode 131 but connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen printing method or a gravure printing method, but the present disclosure is not limited thereto.

Meanwhile, an average thickness to of the internal electrodes 121 and 122 may not be particularly limited.

However, in general, in a case in which the internal electrodes are formed to be thin to have a thickness less than 0.6 µm, in particular, if the thickness of the internal electrodes is 0.35 µm or less, reliability may be lowered.

According to an exemplary embodiment of the present disclosure, since reliability may be improved by disposing an intermediate electrode layer including an alloy containing Sn and Ni between the base electrode layer and the conductive resin layer, excellent reliability may be secured even when the average thickness of the internal electrodes 121 and 122 is 0.35 µm or less.

Accordingly, when the thickness of the internal electrodes 121 and 122 is 0.35 µm or less, the effect according to the present disclosure may be more remarkable and miniaturization and high capacitance of the ceramic electronic component may be more easily achieved.

The average thickness to of the internal electrodes 121 and 122 may refer to an average thickness of the internal electrodes 121 and 122.

The average thickness of the internal electrodes 121 and 122 may be measured by scanning an image of a cross-section of the body 110 in the length-thickness (L-T) direction with a scanning electron microscope (SEM) having a magnification of 10,000. More specifically, the average value may be measured by measuring the thickness of one internal electrode at 30 equally spaced points in a longitudinal direction in the scanned image. The 30 points at equal intervals may be designated in the capacitance forming portion Ac. In addition, if the average value is measured by extending the measurement of the average value to 10 internal electrodes, the average thickness of the internal electrodes may be more generalized.

The external electrodes 131 and 132 may be disposed on the third surface 3 and the fourth surface 4 of the body 110. The external electrodes 131 and 132 may include first and second external electrodes 131 and 132 are respectively disposed on the third and fourth surfaces 3 and 4 of the body 110 and connected to the first and second internal electrodes 121 and 122, respectively.

The first external electrode 131 may include the first base electrode layer 131a disposed on the third surface, the first intermediate electrode layer 131b disposed on the first base electrode layer, and the first conductive resin layer 131c disposed on the first intermediate electrode layer and extending to the first and second surfaces, and the second external electrode 132 may include a second base electrode layer disposed on the fourth surface, the second intermediate electrode layer disposed on the second base electrode layer, and the second conductive resin layer disposed on the second intermediate electrode layer and extending to the first and second surfaces.

The first and second base electrode layers 131a and 132a may include Ni and glass.

Since the base electrode layers 131a and 132a include Ni, the occurrence of radiating cracks may be suppressed, and since the base electrode layers 131a and 132a include glass, bonding strength with the body 110 may be improved.

If Cu is used as a metal included in the base electrode layer and the internal electrode includes Ni, a diffusion rate of Cu into Ni is much faster than a rate at which Ni diffuses into Cu, and thus, a large amount of Cu flows toward the internal electrode and the volume of the internal electrode expands, which may cause radiating cracks.

In the present disclosure, as the base electrode layers 131a and 132a include Ni, the expansion of the volume of the internal electrodes may be suppressed, compared to a case in which the base electrode layers 131a and 132a include Cu, and accordingly, the occurrence of radiating cracks may be suppressed. In addition, even in a case in which the internal electrodes include a metal other than Ni, since the diffusion rate of Cu is faster than that of most metals except for Ag and since the base electrode layers 131a and 132a include Ni, an expansion of the volume of the internal electrodes may be suppressed compared to a case in which the base electrode layers 131a and 132a include Cu.

In an exemplary embodiment, when a thickness of the first base electrode layer 131a measured at the center of the body 110 in the first direction is t1 and a thickness of the first base electrode layer 131a measured at the internal electrode disposed at the outermost side of the body 110 in the first direction is t1', t1'/t1 may be 0.7 or greater and 1.0 or less. As the first base electrode layer 131a has a uniform thickness, the thickness of the first base electrode layer may be formed to be thin, thereby improving the capacitance per unit volume of the multilayer electronic component. Also, since the second base electrode layer 132a may have a symmetrical relationship with the first base electrode layer 131a in the second direction, the same may be applied to the second base electrode layer 132a.

Meanwhile, a method for controlling t1'/t1 to be 0.7 or greater and 1.0 or less may not be particularly limited. For example, as described later, t1'/t1 may be controlled to be 0.7 or greater and 1.0 or less by formation using a sheet including Ni and glass.

In addition, t1 and t1' may be measured by observing cross-sections cut in the first and second directions at the center of the body in the third direction with a scanning electron microscope (SEM) at a magnification of 2000 times or greater.

In an exemplary embodiment, an average thickness of the first and second base electrode layers 131a and 132a may be 0.1 µm or greater, respectively. That is, the average thickness of the first base electrode layer 131a may be 0.1 µm or greater, and the average thickness of the second base electrode layer 132a may also be 0.1 µm or greater.

If the average thickness of the first and second base electrode layers 131a and 132a is less than 0.1 µm, Sn in the intermediate electrode layers 131b and 132b may be diffused into the internal electrode, thereby reducing the capacitance of the multilayer electronic component. In some embodiments, the average thickness of the first and second base electrode layers 131a and 132a may be not more than 10 µm.

The average thickness of the first and second base electrode layers 131a and 132a may be measured in a cross-section of the multilayer electronic component cut in the first and second directions at the center of the body in the third direction, and may be a value obtained by averaging the thicknesses measured at five points spaced at equal intervals in the first direction. In addition, it may be measured by observing with a scanning electron microscope (SEM) at a magnification of 2000 times or greater.

Meanwhile, an upper limit of the average thickness of the first and second base electrode layers 131a and 132a may not be particularly limited. For example, the average thickness of the first and second base electrode layers 131a and 132a may each be 10 μm or less.

In an exemplary embodiment, the first and second base electrode layers 131a and 132a may be disposed between an extension line E1 of the first surface of the body and an extension line E2 of the second surface of the body. Accordingly, the effect of reinforcing flexural strength according to the present disclosure may be further improved and the multilayer electronic component may be prevented from increasing in size, thereby improving the capacitance per unit volume.

If the first and second base electrode layers 131a and 132a extend to the first surface beyond the extension line E1 of the first surface or to the second surface beyond the extension line E2 of the second surface, flexural strength and capacitance per unit volume may decrease.

In an exemplary embodiment, the body may include a first-third corner connecting the first surface and the third surface, a first-fourth corner connecting the first surface and the fourth surface, a second-third corner connecting the second surface and the third surface, and a second-fourth corner connecting the second surface and the fourth surface. The first-third corner and the second-third corner may be contracted to the center of the body in the first direction in a direction toward the third surface, and the first-fourth corner and the second-fourth corner may be contracted to the center of the body in the first direction. The first base electrode layer may be disposed to extend to the first-third corner and the second-third corner, and the second base electrode layer may be disposed to extend to the first-fourth corner and the second-fourth corner.

If the first and second base electrode layers 131a and 132a extend to the first surface beyond the first-third corner and the first-fourth corner or extend to the second surface beyond the first-fourth corner and the second-fourth corner, the flexural strength and the capacitance per unit volume may decrease.

The first and second intermediate electrode layers 131b and 132b may include an alloy including Sn and Ni.

Sn has a low melting point and forms an alloy with a metal included in the base electrode layer even at a low temperature of 150° C. or greater and 300° C. or less, thereby improving the physical and electrical connectivity between the base electrode layers 131a and 132a and the conductive resin layers 131c and 132c. In addition, since Sn and the alloy containing Sn has a low permeability (hydrogen diffusion coefficient) with respect to hydrogen compared to other metals, hydrogen may be prevented from penetrating. If hydrogen is diffused into the body 110, a reduction reaction of the dielectric layer 111 may be accelerated, which may cause deterioration of insulation resistance, and thus high-temperature reliability may be reduced.

Accordingly, the first and second intermediate electrode layers 131b and 132b include an alloy containing Sn and Ni, thereby suppressing penetration of hydrogen into the body and improving the physical and electrical connectivity between the base electrode layers 131a and 132a and the conductive resin layers 131c and 132c.

The first and second intermediate electrode layers 131b and 132b may be formed by disposing a Sn plating layer on the first and second base electrode layers 131a and 132a, applying a paste containing a resin and a metal on the Sn plating layer, and then performing a heat treatment so that Sn of the Sn plating layer may be diffused into the first and second base electrode layers to form an alloy with Ni of the first and second base electrode layers. A method of forming an intermediate electrode layer by applying a paste containing resin, metal, and Sn on the base electrode layer, without disposing a Sn plating layer on the base electrode layers 131a and 132a, and then performing a heat-treatment may be considered. In this case, however, since a heat treatment should be performed at a high temperature of 350° C. or higher to form a sufficient intermediate electrode layer, thermal decomposition of organic materials such as resin may be caused, which may cause problems such as a decrease in the strength of the external electrodes and a decrease in flexural strength.

In an exemplary embodiment, the average thickness t2 of the first and second intermediate electrode layers 131b and 132b may be 1 μm or greater. If the average thickness t2 of the first and second intermediate electrode layers 131b and 132b is less than 1 μm, the entire surface of the base electrode layers 131a and 132a may not be covered and the first and second intermediate electrode layers 131b and 132b may be disconnected, and thus, the effect of suppressing hydrogen permeation and the effect of improving the connectivity between the base electrode layer and the conductive resin layer may be insufficient.

Meanwhile, an upper limit of the average thickness t2 of the first and second intermediate electrode layers 131b and 132b is not particularly limited. For example, the average thickness t2 of the first and second intermediate electrode layers 131b and 132b may be 10 μm or less.

The average thickness t2 of the first and second intermediate electrode layers 131b and 132b is measured in a cross-section of the multilayer electronic component 100 cut in the first and second directions at the center of the body 110 in the third direction and may be a value obtained by averaging thicknesses measured at five points spaced at equal intervals in the first direction. In addition, it may be measured by observing with a scanning electron microscope (SEM) at a magnification of 2000 times or greater.

In an exemplary embodiment, the first and second intermediate electrode layers 131b and 132b may further include glass.

Sn in the Sn plating layers 131b-1 and 132b-1 disposed on the base electrode layers 131a-1 and 132a-1 before a curing heat treatment is diffused into the base electrode layers 131a-1 and 132a-1 during the heat treatment process to form a portion or the entirety of the electrode layers 131b and 132b, and the glass included in the first and second intermediate electrode layers 131b and 132b may be glass included in the base electrode layers 131a-1 and 132a-1 before the curing heat treatment.

Figure 7:
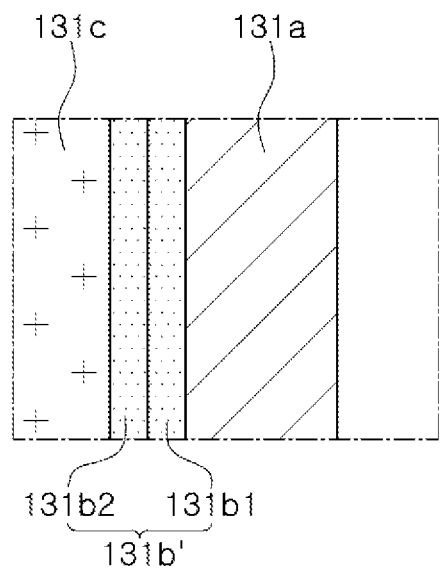
FIG. 7 is an enlarged view of a region corresponding to region K2 of FIG. 2 as an enlarged view of an external electrode according to a modified example of the present disclosure.

Referring to FIG. 7, the first intermediate electrode layer 131b' may include a first layer 131b1 including the alloy and glass and a second layer 131b2 disposed on the first layer and including glass and Sn. Also, the second intermediate electrode layer may include a first layer including the alloy and glass and a second layer disposed on the first layer and including glass and Sn.

Sn of the Sn plating layers 131b-1 and 132b-1 disposed on the base electrode layers 131a-1 and 132a-1 before the curing heat treatment may be diffused into the base electrode layers 131a-1 and 132a-1 during the heat treatment process so that a portion thereof forms an alloy with Ni of the base electrode layers 131a-1 and 132a-1 to configure the first layer 131b1, and a portion of the diffused Sn may not form an alloy with Ni and may configure the second layer 131b2.

Figure 8:
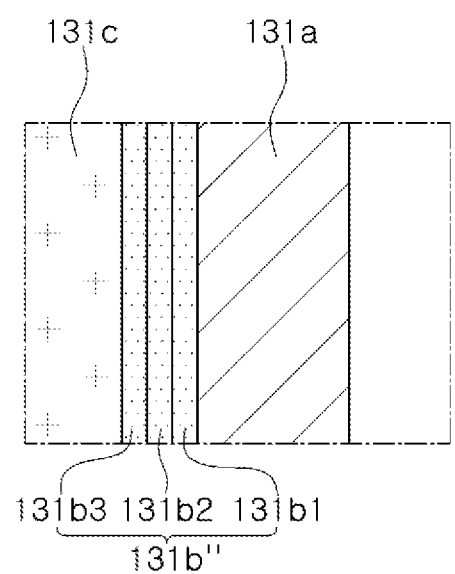
FIG. 8 is an enlarged view of a region corresponding to region K2 of FIG. 2 as an enlarged view of an external electrode according to another modified example of the present disclosure.

Also, referring to FIG. 8, a first intermediate electrode layer 131b" may further include a third layer 131b3 disposed on the second layer 131*b*2. In addition, the second intermediate electrode layer may further include a third layer disposed on the second layer.

In this case, the third layer 131*b*3 may be a Sn plating layer. This is because a portion of the Sn plating layers 131*b*-1 and 132*b*-1 before the curing heat treatment may remain as the Sn plating layer, rather than being diffused into the base electrode layers 131*a*-1 and 132*a*-1.

In addition, in the third layer 131*b*3, the number of moles of Sn relative to a total number of moles of elements constituting the third layer 131*b*3 may be 0.95 or greater. That is, excluding impurities, the third layer may be formed of Sn. For example, the total number of moles of Sn relative to a total number of moles of elements constituting the third layer 131*b*3 may be obtained by performing SEM-EDS analysis on the third layer in a cross-section of the multilayer electronic component, and may be a value obtained by averaging the measurements at five points spaced equally in the first direction. Other methods and/or tools appreciated by one of ordinary skill in the art, even if not described in the present disclosure, may also be used.

The first and second conductive resin layers 131*c* and 132*c* may include a resin and a metal.

The metal included in the first and second conductive resin layers 131*c* and 132*c* is not particularly limited as long as it is a material that may be electrically connected to the intermediate electrode layers 131*b* and 132*b*, and may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The metal included in the first and second conductive resin layers 131*c* and 132*c* may include at least one of spherical powder particles and a flaky powder particles. That is, the metal may be formed of only flake powder particles or only spherical powder particles, or a mixture of flake powder particles and spherical powder particles. Here, the spherical powder particles may include a form that is not perfectly spherical, for example, a form in which the ratio of the lengths of the major axis to the minor axis (major axis/minor axis) is 1.45 or less. The flake-type powder particles refer to powder particles having a flat and elongated shape and, for example, the ratio of the lengths of the major axis to the minor axis (major axis/minor axis) thereof may be 1.95 or greater, but is not limited thereto. The lengths of the major axis and minor axis of the spherical powder particles and flake-type powder particles may be measured from an image obtained by scanning a cross-section in the first and second directions (L-T cross-section) taken at the center of the multilayer electronic component in the third direction with a scanning electron microscope (SEM).

The resin included in the first and second conductive resin layers 131*c* and 132*c* serves to secure bondability and absorb shock. The resin included in the first and second conductive resin layers 131*c* and 132*c* is not particularly limited as long as it may have bonding properties and shock absorption properties and may be mixed with conductive metal powder particles to form a paste. For example, the resin may include one or more selected from among an epoxy resin, an acrylic resin, ethyl cellulose, and the like.

In addition, the first and second conductive resin layers 131*c* and 132*c* may include a plurality of metal particles, an intermetallic compound, and a resin. As the intermetallic compound is included, electrical connectivity with the first electrode layers 131*a* and 132*a* may be further improved. The intermetallic compound may serve to improve electrical connectivity by connecting the plurality of metal particles, and may serve to surround and connect the plurality of metal particles to each other.

In this case, the intermetallic compound may include a metal having a melting point lower than a curing temperature of the resin. That is, since the intermetallic compound includes a metal having a melting point lower than the curing temperature of the resin, a metal having a melting point lower than the curing temperature of the resin is melted during a drying and curing process and may form an intermetallic component with a portion of metal particles to surround the metal particles. In this case, the intermetallic compound may preferably include a low-melting-point metal of 300° C. or less.

In an exemplary embodiment, the first and second conductive resin layers 131*c* and 132*c* may include Sn. Sn included in the first and second conductive resin layers 131*c* and 132*c* may be either Sn in the Sn plating layers 131*b*-1 and 132*b*-1 diffused during the heat treatment process or Sn added to the paste for forming the conductive resin layer. In the process of drying and curing, Sn is melted, and the molten Sn wets high-melting-point metal particles such as Ag, Ni, or Cu by a capillary phenomenon and reacts with some of the Ag, Ni or Cu metal particles to form intermetallic compounds such as $Ag_3Sn$, $Ni_3Sn_4$, $Cu_6Sn_5$, and $Cu_3Sn$. Ag, Ni or Cu not participating in the reaction remains in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$, and $Cu_3Sn$.

The conductive resin layers 131*c* and 132*c* may be disposed on the intermediate electrode layers 131*b* and 132*b* to extend to the first and second surfaces. Thereby, flexural strength may be improved, and an occurrence of mounting cracks and flex cracks may be suppressed.

In an exemplary embodiment, the plating layers 131*d* and 132*d* disposed on the first and second conductive resin layers 131*c* and 132*c* may be further included.

The plating layers 131*d* and 132*d* serve to improve mounting characteristics. The type of the plating layers 131*d* and 132*d* is not particularly limited, may be a plating layer including at least one of Ni, Sn, Pd, and alloys thereof, and may be formed of a plurality of layers.

As a more specific example of the plating layers 131*d* and 132*d*, the plating layers 131*d* and 132*d* may be a Ni plating layer or a Sn plating layer, may have a form in which a Ni plating layer and a Sn plating layer are sequentially formed on the conductive resin layers 131*c* and 132*c*, and may have a form in which the Sn plating layer, the Ni plating layer, and the Sn plating layer are sequentially formed. In addition, the plating layers 131*d* and 132*d* may include a plurality of Ni plating layers and/or a plurality of Sn plating layers.

A size of the multilayer electronic component 100 may not be particularly limited.

However, in order to achieve miniaturization and high capacitance at the same time, it is necessary to increase the number of stacks by thinning the thickness of the dielectric layer and the internal electrode, and thus, the effect of improving reliability and capacitance per unit volume according to the present disclosure may become more remarkable in the multilayer electronic component 100 having a size of 1005 (length×width, 1.0 mm×0.5 mm) or less.

Accordingly, in consideration of manufacturing errors and the size of the external electrodes, the reliability improvement effect according to the present disclosure may be more remarkable when the length of the multilayer electronic component 100 is 1.1 mm or less and the width is 0.55 mm or less. Here, the length of the multilayer electronic component 100 refers to a maximum size of the multilayer electronic component 100 in the second direction, and the width of the multilayer electronic component 100 refers to a maximum size of the multilayer electronic component 100 in the third direction.

Hereinafter, a method of manufacturing the multilayer electronic component described above will be described. However, the present disclosure is not limited thereto, and contents overlapping the contents described above may be omitted in order to avoid a redundant description.

A method of manufacturing a multilayer electronic component according to an exemplary embodiment of the present disclosure may include preparing a body including a dielectric layer and internal electrodes; compressing the body on a sheet including glass and Ni to attach the sheet to the body and performing a sintering operation to form a base electrode layer; forming an Sn plating layer on the base electrode layer; dipping the body on which the Sn plating layer is formed into a paste containing a resin and a conductive metal to apply the paste to the Sn plating layer; and performing a curing heat treatment on the paste-applied body to form an external electrode, wherein the external electrode includes a base electrode layer disposed on the body, an intermediate electrode layer disposed on the base electrode layer, and a conductive resin layer disposed on the intermediate electrode layer, the base electrode layer of the external electrode includes glass and Ni, the intermediate electrode layer includes an alloy containing Sn and Ni, and the conductive resin layer includes a resin and a metal.

The body 110 including the dielectric layer and the internal electrodes may be formed by stacking ceramic green sheets on which the internal electrodes 121 and 122 are printed and then performing sintering. In addition, the body 110 may be formed by alternately stacking the ceramic green sheet on which the first internal electrode 121 is printed and the ceramic green sheet on which the second internal electrode 122 are printed and then performing sintering.

Figure 9:
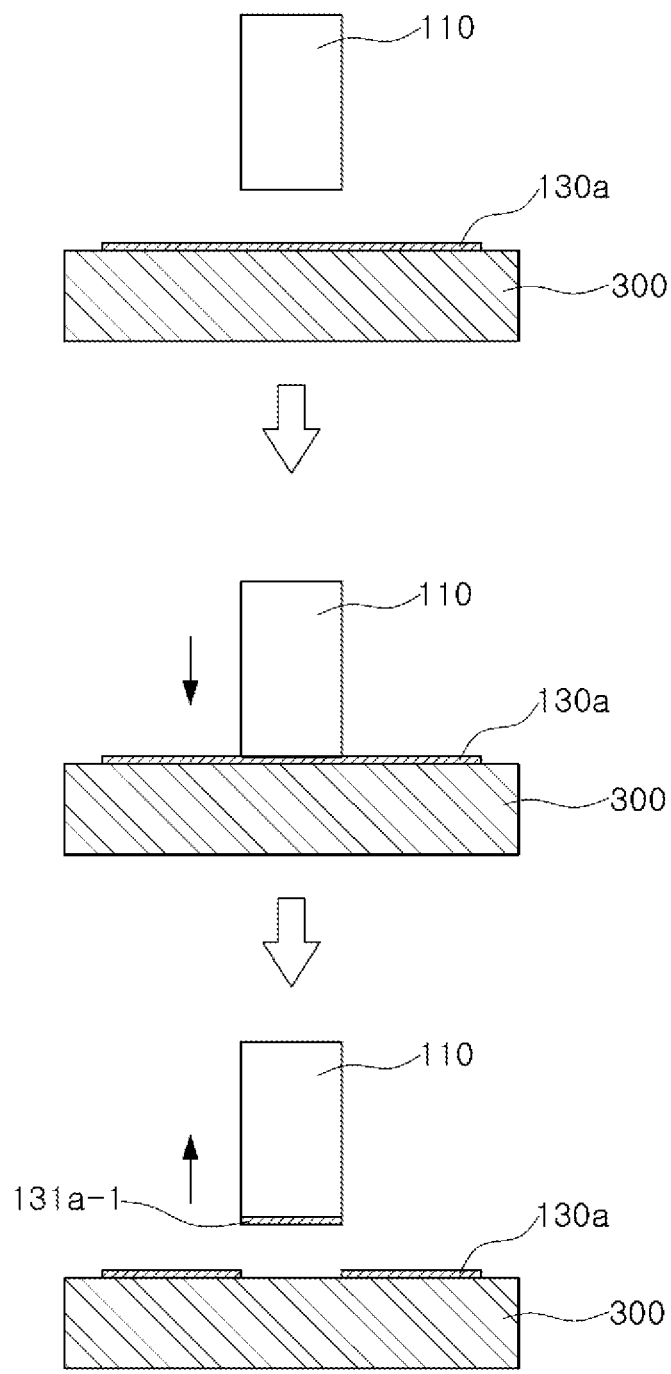
FIG. 9 is a view illustrating an operation of forming a base electrode layer.

Thereafter, referring to FIG. 9, after a sheet 130a including glass and Ni is prepared on a support 300, the body 110 may be compressed against the sheet 130a to attach the sheet 130a to one surface of the body 110. Thereafter, the sheet 130a may also be compressed to the opposite side of the body 110 to be attached thereto. Thereafter, the body 110 to which the sheet is attached may be sintered to form the base electrode layer 131a-1.

The sheet 130a may include components such as a binder and an organic solvent in a state before sintering. In addition, the base electrode layer 131a-1 is in a state before the curing heat treatment, and after the curing heat treatment, a portion of the base electrode layer 131a-1 constitutes the intermediate electrode layer 131b due to the diffusion of Sn, so that the thicknesses before and after the curing heat treatment may be different.

According to the method of transferring the sheet, the base electrode layer 131a-1 may be disposed between the extension line E1 of the first surface of the body and the extension line E2 of the second surface of the body, and may not be disposed on the first and second surfaces of the body.

Thereafter, Sn plating layers 131b-1 and 132b-1 may be formed on the base electrode layers 131a-1 and 132a-2. As a method of forming the Sn plating layers 131b-1 and 132b-1, an electrolytic plating method or an electroless plating method may be used.

Figure 10:
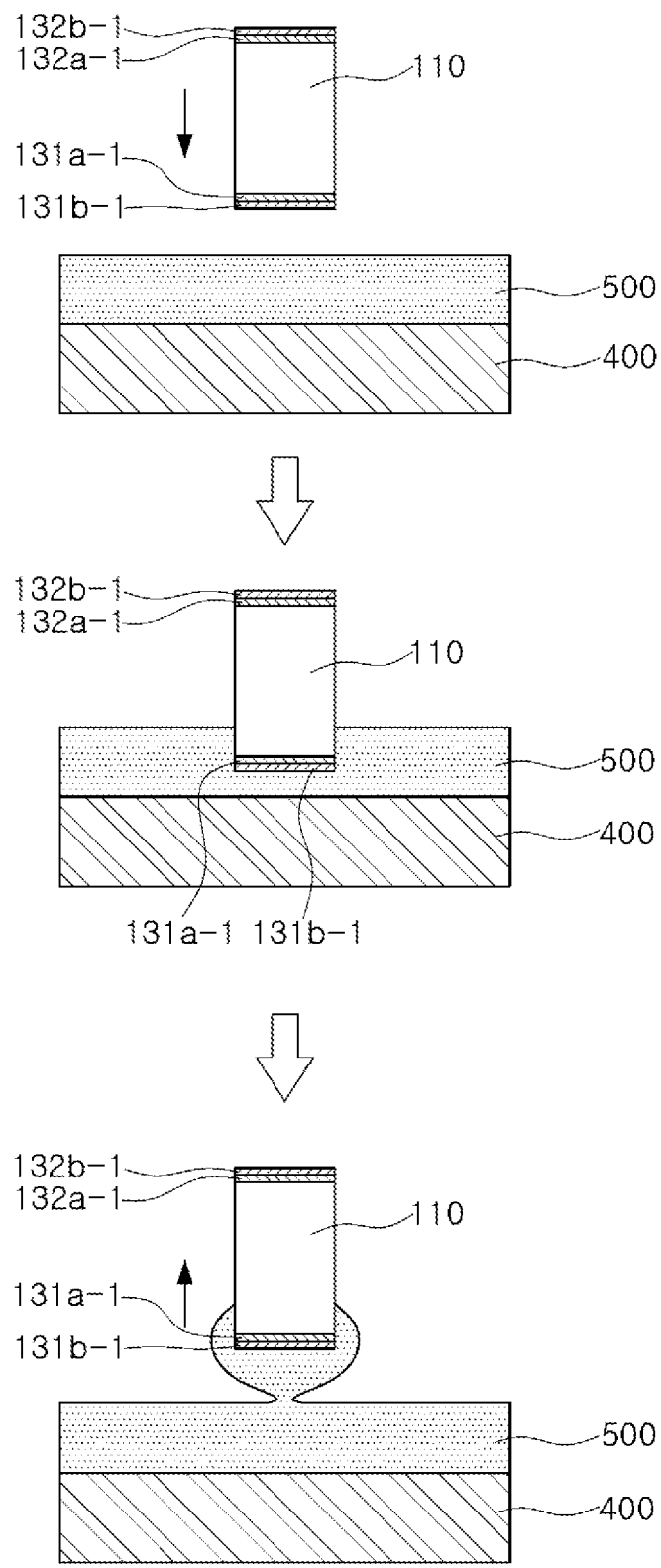
FIG. 10 is a view illustrating an operation of applying paste.

Thereafter, as shown in FIG. 10, a paste 500 containing a resin and a metal may be prepared on a surface plate 400, and the body 110 on which the Sn plating layers 131b-1 and 132b-1 are formed is dipped into a paste 500 so that the paste 500 may be applied on the Sn plating layers 131b-1 and 132b-1.

Thereafter, the body 110 to which the paste 500 is applied may be cured and heat-treated to form the external electrodes 131 and 132.

By the curing heat treatment, Sn of the Sn plating layers 131b-1 and 132b-1 may be diffused into the base electrode layers 131a-1 and 132a-2 to form an alloy with Ni contained in the base electrode layers 131a-1 and 132a-2, so that the intermediate electrode layers 131b and 132b including Sn and Ni alloy may be formed. In addition, a plating solution, moisture, hydrogen, etc. absorbed while forming the Sn plating layers 131b-1 and 132b-1 may be removed by the curing heat treatment, thereby enhancing reliability. Also, a portion of Sn in the Sn plating layers 131b-1 and 132b-1 may diffuse into the conductive resin layers 131c and 132c to form an alloy.

In this case, the curing heat treatment may be performed at a temperature of 150° C. or higher and 300° C. or lower.

According to the present disclosure, since the Sn plating layers 131b-1 and 132b-1 are disposed on the base electrode layers 131a-1 and 132a-2 before the curing heat treatment, the intermediate electrode layers 131b and 132b may be formed to be sufficient even at a low temperature of 150° C. or higher and 300° C. or less.

If the curing heat treatment is performed at a temperature exceeding 300° C., thermal decomposition of organic materials such as resin may be induced, thereby causing problems such as a decrease in strength of the external electrodes and a decrease in flexural strength. If the curing heat treatment is performed at a temperature less than 150° C., curing may be insufficient and the formation of the intermediate electrode layers 131b and 132b may be insufficient.

Thereafter, plating may be performed on the conductive resin layers 131c and 132c to form the plating layers 131d and 132d.

According to an exemplary embodiment of the present disclosure, since the intermediate electrode layers 131b and 132b are disposed, of hydrogen occurring during the plating process for forming the plating layers 131d and 132d may be suppressed from penetrating into the body, thereby improving high temperature reliability.

One of the various effects of the present disclosure is to suppress the penetration of hydrogen into the body by disposing the intermediate electrode layer including an alloy containing Sn and Ni between the base electrode layer and the conductive resin layer.

One of the various effects of the present disclosure is to improve the physical and electrical connectivity between the base electrode layer and the conductive resin layer by disposing the intermediate electrode layer including an alloy containing Sn and Ni between the base electrode layer and the conductive resin layer.

One of the various effects of the present disclosure is to suppress the occurrence of mounting cracks and flex cracks.

One of the several effects of the present disclosure is to suppress the occurrence of radiating cracks.

While example exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode including a first base electrode layer disposed on the third surface, a first intermediate electrode layer disposed on the first base electrode layer, and a first conductive resin layer disposed on the first intermediate electrode layer and extending to the first and second surfaces; and
a second external electrode including a second base electrode layer disposed on the fourth surface, a second intermediate electrode layer disposed on the second base electrode layer, and a second conductive resin layer disposed on the second intermediate electrode layer and extending to the first and second surfaces,
wherein the first and second base electrode layers include glass and Ni, the first and second intermediate electrode layers include an alloy containing Sn and Ni, and the first and second conductive resin layers include a resin and a metal, and
wherein the first and second intermediate electrode layers further include a first layer including the alloy, and a second layer disposed on the first layer and including Sn.

2. The multilayer electronic component of claim 1, wherein the first and second intermediate electrode layers further include the glass.

3. The multilayer electronic component of claim 1, wherein
the first layer further includes the glass and the second layer further includes the glass.

4. The multilayer electronic component of claim 3, wherein the first and second intermediate electrode layers further include a third layer disposed on the second layer, wherein the third layer is a Sn plating layer.

5. The multilayer electronic component of claim 3, wherein
the first and second intermediate electrode layers further include a third layer disposed on the second layer,
wherein a number of moles of Sn relative to a total number of moles of elements constituting the third layer is 0.95 or greater.

6. The multilayer electronic component of claim 1, wherein an average thickness of the first and second intermediate electrode layers is 0.1 µm or greater.

7. The multilayer electronic component of claim 1, wherein t1'/t1 is greater than or equal to 0.7 and less than or equal to 1.0 in which t1 is a thickness of the first base electrode layer measured at a center of the body in the first direction, and t1' is a thickness of the first base electrode layer measured at the internal electrode disposed at an outermost portion of the body in the first direction.

8. The multilayer electronic component of claim 1, wherein an average thickness of the first and second base electrode layers is 0.1 µm or greater.

9. The multilayer electronic component of claim 1, wherein the first and second base electrode layers are disposed between an extension line of the first surface and an extension line of the second surface.

10. The multilayer electronic component of claim 1, wherein
the body includes a first-third corner connecting the first surface and the third surface, a first-fourth corner connecting the first surface and the fourth surface, a second-third corner connecting the second surface and the third surface, and a second-fourth corner connecting the second surface and the fourth surface,
the first-third corner and the second-third corner have a form that is contracted to the center of the body in the first direction, in a direction toward the third surface, and the first-fourth corner and the second-fourth corner have a form that is contracted to the center of the body in the first direction, in a direction toward the fourth surface,
the first base electrode layer is disposed to extend to the first-third corner and the second-third corner, and the second base electrode layer is disposed to extend to the first-fourth corner and the second-fourth corner.

11. The multilayer electronic component of claim 1, further comprising a plating layer disposed on the first and second conductive resin layers.

12. The multilayer electronic component of claim 1, wherein the first and second conductive resin layers include Sn.

13. A method of manufacturing the multilayer electronic component of claim 1, the method comprising:
preparing the body including the dielectric layer and the first and second internal electrodes;
compressing the body on a sheet including glass and Ni to attach the sheet to the body and performing a sintering operation to form the first base electrode layer;
forming an Sn plating layer on the first base electrode layer;
dipping the body on which the Sn plating layer is formed into a paste containing the resin and the conductive metal to apply the paste to the Sn plating layer; and
performing a curing heat treatment on the paste-applied body to form the first intermediate electrode layer and the first conductive resin layer,
wherein the first intermediate electrode layer includes a first layer including the alloy, and a second layer disposed on the first layer and including Sn.

14. The method of claim 13, wherein the curing heat treatment is performed at a temperature of 150° C. or higher and 300° C. or lower.

15. The method of claim 14, wherein the first intermediate electrode layer further includes the glass.

16. The method of claim 15, wherein the first layer further includes the glass and the second layer further includes the glass.

17. A multilayer electronic component comprising:
a body including a dielectric layer and first and second internal electrodes alternately disposed with the dielectric layer interposed therebetween in a first direction and including first and second surfaces opposing each other in the first direction, and third and fourth surfaces connected to the first and second surfaces and opposing each other in a second direction;
a first external electrode including a first base electrode layer disposed on the third surface, a first intermediate electrode layer disposed on the first base electrode layer, and a first conductive resin layer disposed on the first intermediate electrode layer and extending to the first and second surfaces; and
a second external electrode including a second base electrode layer disposed on the fourth surface, a second intermediate electrode layer disposed on the second base electrode layer, and a second conductive resin layer disposed on the second intermediate electrode layer and extending to the first and second surfaces, wherein the first and second base electrode layers include glass and Ni, the first and second intermediate electrode layers include a Sn plating layer and an alloy containing Sn and Ni, and the first and second conductive resin layers include a resin and a metal.

18. The multilayer electronic component of claim 17, wherein the first and second intermediate electrode layers further include the glass.

19. The multilayer electronic component of claim 17, wherein the first and second intermediate electrode layers further include a first layer including the alloy and the glass and a second layer disposed on the first layer and including the glass and Sn.

20. The multilayer electronic component of claim 19, wherein the Sn plating layer is disposed on the second layer.

* * * * *